July 29, 1958  K. GEROWIN  2,845,212
PROTECTING ARTIFICIAL FLOWERS ON WOMEN'S OUTERGARMENTS
Filed Jan. 14, 1955
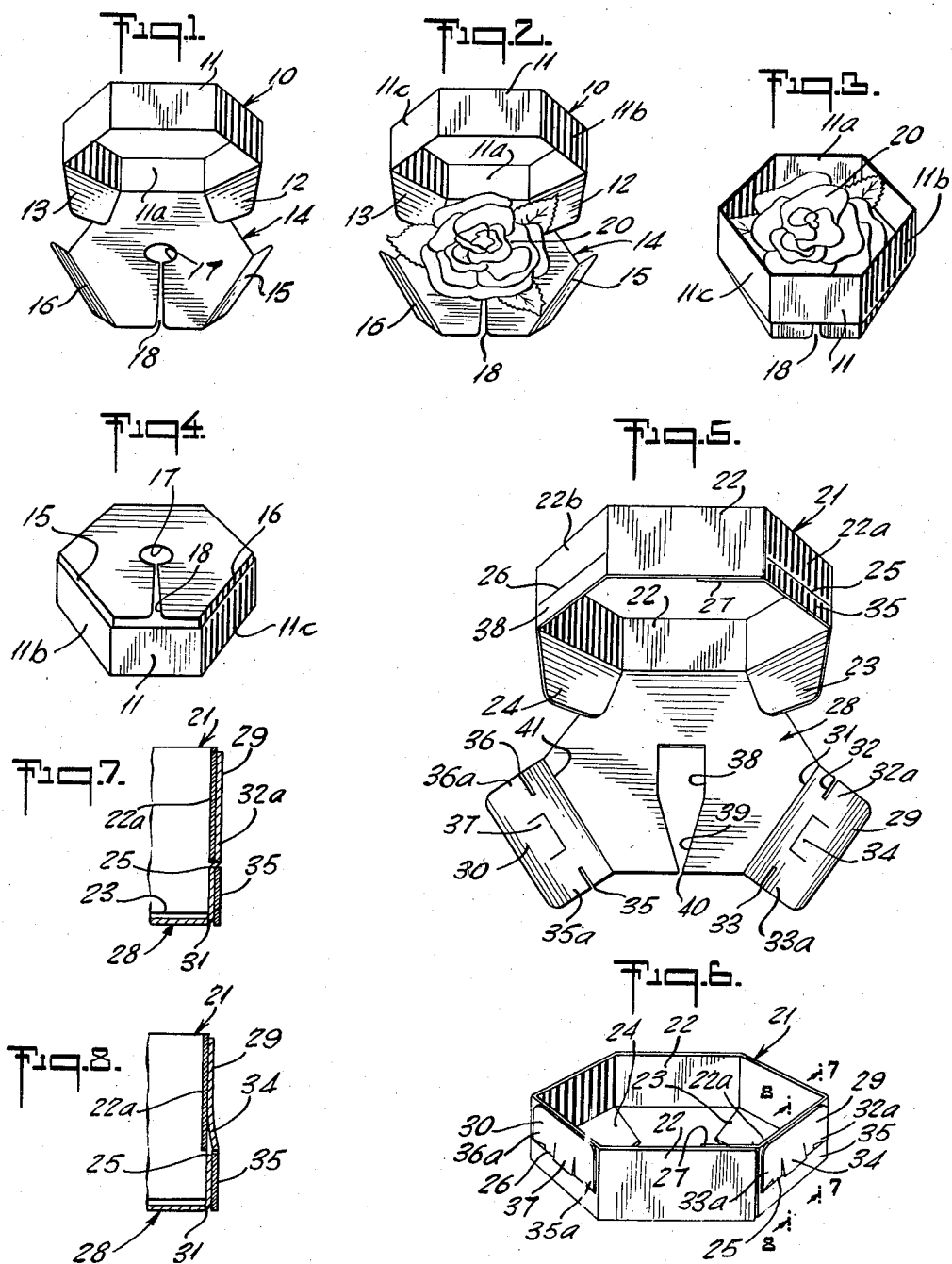
INVENTOR
KIBBY GEROWIN
BY J. C. Grier
ATTORNEY

United States Patent Office 2,845,212
Patented July 29, 1958

2,845,212

PROTECTING ARTIFICIAL FLOWERS ON WOMEN'S OUTERGARMENTS

Kibby Gerowin, Belle Harbor, N. Y.

Application January 14, 1955, Serial No. 481,754

1 Claim. (Cl. 229—39)

This invention relates to an improved device for protecting artificial flower boutonnieres and has for a principal object the provision of a normally collapsed cup-like device which may be applied over the stem portion of an artificial flower and containing extensions which engage the sides of the cup-like body beneath the flower in such a manner that the flower per se is contained within the open cup and is protected by the edges of the cup-like device so that such flowers are not damaged or crushed when the garments are shipped.

Another object of the invention is to provide a cup-like device for protecting artificial flowers and other decorative means on women's wearing apparel which is applied beneath and around such decorative means and then has portions interlocked so that the act of removing the device from the decoration destroys the device.

A further object of the invention is the provision of a cup-like protector of the character described which has a portion which lies in contact with the surface of the garment to which a flower or other decorative media is applied and which has interlocked therewith embracing side walls which prevent the flower or other decorative media from being crushed in shipment.

Other objects and advantages of the present invention will be apparent to those skilled in the art upon the study of this specification and the accompanying drawings.

Referring to the drawings which are given by way of example to illustrate the invention:

Figure 1 is a perspective view of my device ready to be applied to an artificial flower or other decorative means on a garment, Figure 2 is a view similar to Figure 1, showing the device after its base portion has been slipped under the flower or the like, with slot means therein straddling the stem or other attachment means secured to a garment;

Figure 3 is a perspective view of said device with the collar or rim portion in a position approaching and almost in contact with said base portion and embracing the flower or the like, certain tabs of the device being in contact with said rim portion and others in contact with said base portion;

Figure 4 is a view showing my improved device in an inverted position;

Figure 5 is a perspective view of a modification of the device shown in Figure 1;

Figure 6 is a perspective view of the modification shown in Figure 5 with the device folded into a cup-like member, the flower or other ornament having been omitted;

Figure 7 is a sectional elevation taken along the line 7—7 of Figure 6; and

Figure 8 is a sectional elevation taken along the line 8—8 of Figure 6.

My new and improved device 10, referring first to Figure 1 is comprised of a hexagonal collar or rim portion 11. Preferably formed integral with this rim portion 11 is a depending tab 12 and spaced apart therefrom is a second depending tab 13. Also formed integral with the side 11a of the rim portion is a base portion generally designated by the numeral 14. In the embodiment shown, this base portion is also generally hexagonal in form and it has preferably formed integral therewith upstanding tabs 15 and 16. The base portion 14 also has a hole 17 formed therein somewhat centrally located and communicating with the hole 17 is a slot 18. The base portion 14 is devised to slip under a flower 20 or other decoration on a garment, by registering the stem of the flower with the slot 18 and then pushing the base beneath the flower 20 so as to bring the stem into the hole 17. When this is done (except for the omission of the garment) the flower and the device have an appearance like that shown in Figure 2. Now in order to apply the device in protective relation to the flower, the tabs 12 and 13 are turned inwardly so that when the rim portion is pushed downwardly to embrace the flower, the tabs 12 and 13 will lie flat on the base portion 14 somewhat beneath the flower. At the same time, the tabs 15 and 16 are folded upwardly and as the rim portion 11 is brought down toward the base portion 14, the tabs 15 and 16 contact the inner walls of the sides 11b and 11c and when the rim portion 11 approaches the level of the base portion 14 the combination somewhat has the appearance shown in Figure 3.

Figure 4 shows the device in a folded position and clearly shows the base portion 14, the hole 17 and the slot 18.

Referring to Figures 5 to 8, the modified form of the device 21 has a polygonal rim portion and preferably formed integral with the rim portion 22 are spaced apart depending tabs 23 and 24. The portion 22a has a slot or slit 25 formed therein preferably parallel to one edge thereof. Likewise the portion 22b has a longitudinal slot or slit 26 formed therein substantially parallel to one edge thereof. The rim portion 22 may have a tab 27 secured to the lower surface thereof, said tab being an extension of the portion 22a.

Also formed integral with the rim portion 22 is a base portion 28 which has formed integral therewith tabs 29 and 30. The tab 29 is folded upwardly along a line 31 and it has spaced apart aligned slots 32 and 33 which define miniature tabs 32a and 33a, respectively. These miniature tabs cooperate with an edge of the slot or slit 25 in a manner to be presently described. The tab 29 also has a U-shaped score 34 formed therein to define a central locking tab which also cooperates with one edge of the slot or slit 25 in a manner to be presently described. The tab 30 also has aligned slots 35 and 36 and is folded upwardly along the line 41, the slots 35 and 36 define locking tabs 35a and 36a which cooperate with one edge of the slot or slit when assembled and the tab 30 also has a U-shaped score 37 which defines a central locking tab which cooperates with said last mentioned edge of the slot 26. Within the base portion 28 is a somewhat rectangular hole 38, and communicating with this hole is a tapered passage 39 which terminates in a comparatively narrow slot 40 adjacent to one of the base 28.

The modified device 21 is shown in Figure 6 in the form of a cup. In applying the device in protective relation with a flower which is secured to an article of wearing apparel, the device is moved along the surface of the garment so as to bring the tapered passage 39 over the stem of the flower so that the flower will not be crushed or damaged in shipment, for example. In applying it under the flower, the stem of the flower enters the passage 39 via the opening 40 and when the flower is somewhat centralized with the base portion 28 the stem usually lies within the rectangular area 38. Following this, the tabs 23 and 24 on the rim portion 21 are bent upwardly as the rim portion 21 is swung over to embracing relationship with the flower then the tabs 29 and 30 are bent upwardly along the lines 31 and 41, respectively. Then the tab 29 is slipped under the portion 35 of the hexagonal portion 22a and the tab 29 is made to overlie the surface of the side portion 22a above the slot 25 and when this is done, the tab 34 springs outwardly and overlies the edge of the slot 25 in the manner shown in Figure 6.

At the same time, the tabs 32a and 33a spring outwardly and overlie the edge of the slot 25. The tab 30 is slipped under the portion 38 and through the slot 26 so that the upper portion thereof overlies the surface 22b and when this is done the tab 37 springs outwardly and also the tabs 35a and 36a spring outwardly so that they all overlie the edge of the slot 26.

When the device is so installed the device forms a rigid cup and it surrounds the flower or other ornament on all sides except the open end through which the flower or other ornament is visible. When the device is to be removed from about the flower or other ornament, it is necessary to tear the device up due to the interlocking effect of the tabs over the edges of the slots 25 and 26, respectively.

Although I have herein shown and described by way of example one form of my new and improved protector and a modification thereof, it will be understood that many changes may be made in the arrangement shown and described within the scope of the following claim.

I claim:

A protector for ornament attached to a garment and adapted to be supported by said ornament, said protector comprising; a base portion having slot means in an enlarged inner end central of the base portion and opening on one edge thereof said slot means being adapted to straddle the point of attachment of said ornament, a rim-like portion hingedly connected to said base on one side thereof and embracing said ornament, tab means spaced apart from one another and spaced apart from the hinged connection of said rim and base and having interlocking portions formed integral therewith, and spaced apart slot means formed in said rim-like member substantially parallel to the base thereof, said tab means being adapted to be inserted in said slot means for interlocking said rim and base portions to prevent said protector from becoming detached from said ornament.

References Cited in the file of this patent

UNITED STATES PATENTS

| | | |
|---|---|---|
| 760,886 | Lord | May 24, 1904 |
| 1,950,111 | Heim | Mar. 6, 1934 |
| 1,960,925 | Senat | May 29, 1934 |
| 1,606,523 | Gardner | Nov. 9, 1936 |